United States Patent Office.

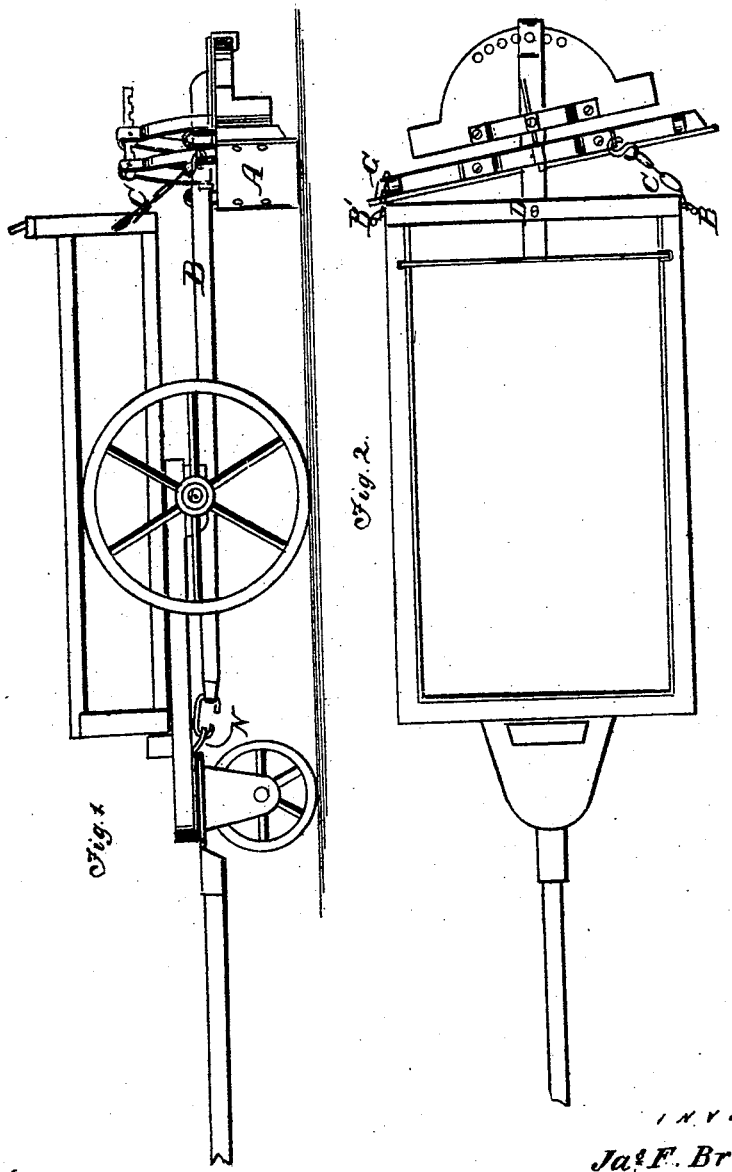

JAMES F. BROOKS, OF STAFFORD SPRINGS, CONNECTICUT.

Letters Patent No. 92,257, dated July 6, 1869.

IMPROVED APPARATUS FOR OPERATING SCRAPERS.

The Schedule referred to in these Letters Patent and making part of the same.

*To all whom it may concern:*

Be it known that I, JAMES F. BROOKS, of Stafford Springs, Tolland county, Connecticut, have invented a new and useful Improvement in Apparatus for Operating Scrapers; and I do hereby declare that the following is a full, clear, and exact description thereof, which will enable others skilled in the art to make and use the same, reference being had to the accompanying drawings, forming part of this specification.

This invention relates to improvements in apparatus for operating scrapers, more especially adapted for employment in connection with an improved scraper heretofore patented to me, which said improved scraper is liable to a considerable lateral or side-draught, which it is the object of this invention to counteract.

Figure 1 represents a side elevation of the said scraper and my improved operating-devices.

Figure 2 represents a plan view of the same.

Similar letters of reference indicate corresponding parts.

A represents the scraper; and
B, the tongue thereof.

The scraper is designed to deliver from one side only, and is therefore exposed to side-draught when the power is applied to the tongue only.

To counteract this action, I construct a cart or vehicle having three wheels, the front wheel being capable of turning freely on its connection with the body of the cart.

Immediately behind the said front wheel, and under the body of the cart, at A, I provide a link or eye for fastening the end of the tongue of the scraper, and I provide at each side of the rear end of the framing, or the box of the cart, hooks B', for connecting the ends of the scraper by chains C.

The said scraper A is arranged to be adjusted on the tongue, to discharge either to the right or left side, and these chains may be adjusted on the said hooks accordingly; and by this method of connecting the said scraper to the vehicle a certain amount of the draught is imparted thereto by the said chains, and the course of the scraper governed by the wheels of the vehicle acting as the fulcrum of a lever, whose long arm is the front portion of the said vehicle.

I am, also, by means of this vehicle, enabled to suspend the scraper above the ground, for conveying it from place to place, over ground whereon it is not required to act.

For this I provide a hook, D, at the top of the rear end of the cart, and suspend the scraper thereon by the chains.

To render this apparatus useful for other purposes, I construct the body of the cart in the ordinary manner of a dump-cart, and thereby make it available for other uses when the scraper is detached.

Having thus described my invention,

What I claim as new, and desire to secure by Letters Patent, is—

The combination, with the scraper A B, of the vehicle herein described, when arranged and attached to the scraper as herein set forth and shown, for the purpose specified.

JAMES F. BROOKS.

Witnesses:
SAML. ALLEN,
HORATIO G. WEST.